(12) United States Patent
Gordon et al.

(10) Patent No.: US 10,607,293 B2
(45) Date of Patent: Mar. 31, 2020

(54) AUTOMATED INSURANCE TOGGLING FOR SELF-DRIVING VEHICLES

(71) Applicant: INTERNATIONAL BUSINESS MACHINES CORPORATION, Armonk, NY (US)

(72) Inventors: Michael S. Gordon, Yorktown Heights, NY (US); James R. Kozloski, New Fairfield, CT (US); Ashish Kundu, New York, NY (US); Peter K. Malkin, Ardsley, NY (US); Clifford A. Pickover, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 441 days.

(21) Appl. No.: 14/927,647

(22) Filed: Oct. 30, 2015

(65) Prior Publication Data
US 2017/0124658 A1    May 4, 2017

(51) Int. Cl.
*G06Q 40/08*    (2012.01)
*G06K 9/00*    (2006.01)
*G01C 21/34*    (2006.01)

(52) U.S. Cl.
CPC ............ *G06Q 40/08* (2013.01); *G01C 21/34* (2013.01); *G06K 9/00785* (2013.01); *G06K 9/00838* (2013.01)

(58) Field of Classification Search
CPC .... G06Q 50/30; G05D 1/0088; G05D 1/0061; B60W 50/14
See application file for complete search history.

(56) References Cited

U.S. PATENT DOCUMENTS

| 4,665,395 A | 5/1987 | Van Ness |
| 4,908,988 A | 3/1990 | Yamamura et al. |

(Continued)

FOREIGN PATENT DOCUMENTS

| CA | 2447554 A1 | 11/2000 |
| CN | 1135063 | 11/1996 |

(Continued)

OTHER PUBLICATIONS

Christine O'Brien. Autonomous Vehicle Technology: Considerations for the Auto Insurance Industry. University Transportation Resource Center, the 2nd Connected Vehicles Symposium, Rutgers University (Jun. 17, 2013).*

(Continued)

*Primary Examiner* — Virpi H Kanervo
(74) *Attorney, Agent, or Firm* — Law Office of Jim Boice

(57) ABSTRACT

A method and/or computer program product automatically toggles insurance policy provisions for a self-driving vehicle (SDV) based on an operational mode of the SDV. One or more processor(s) receive an electronic signal indicating an operational mode of an SDV in real-time, where operational mode is either an autonomous mode or a manual mode. A first insurance policy provision provides coverage while the SDV is operating in the autonomous mode, and a second insurance policy provision provides coverage while the SDV is operating in the manual mode. The processor(s) monitor the SDV for a change in real-time to the operational mode of the SDV. In response to detecting a change in real-time to the operational mode of the SDV, the processor(s) dynamically toggle activation of the first and second insurance policy provisions consistent with the change in real-time to the operational mode of the SDV.

20 Claims, 7 Drawing Sheets

(56) References Cited

U.S. PATENT DOCUMENTS

| | | |
|---|---|---|
| 5,975,791 A | 11/1999 | McCulloch |
| 6,064,970 A | 5/2000 | McMillan et al. |
| 6,201,318 B1 | 3/2001 | Guillory |
| 6,326,903 B1 | 12/2001 | Gross et al. |
| 6,393,362 B1 | 5/2002 | Burns |
| 6,502,035 B2 | 12/2002 | Levine |
| 6,587,043 B1 | 7/2003 | Kramer |
| 6,622,082 B1 | 9/2003 | Schmidt et al. |
| 6,731,202 B1 | 5/2004 | Klaus |
| 6,810,312 B2 | 10/2004 | Jammu et al. |
| 7,124,088 B2 | 10/2006 | Bauer et al. |
| 7,580,782 B2 | 8/2009 | Breed et al. |
| 7,769,544 B2 | 8/2010 | Blesener et al. |
| 7,877,269 B2 | 1/2011 | Bauer et al. |
| 7,894,951 B2 | 2/2011 | Norris et al. |
| 7,979,173 B2 | 7/2011 | Breed |
| 8,031,062 B2 | 10/2011 | Smith |
| 8,045,455 B1 | 10/2011 | Agronow et al. |
| 8,078,349 B1 | 12/2011 | Prada Gomez et al. |
| 8,090,598 B2 | 1/2012 | Bauer et al. |
| 8,139,109 B2 | 3/2012 | Schmiedel et al. |
| 8,140,358 B1 | 3/2012 | Ling et al. |
| 8,146,703 B2 | 4/2012 | Baumann et al. |
| 8,152,325 B2 | 4/2012 | McDermott |
| 8,346,480 B2 | 1/2013 | Trepagnier et al. |
| 8,352,112 B2 | 1/2013 | Mudalige |
| 8,442,854 B2 | 5/2013 | Lawton et al. |
| 8,466,807 B2 | 6/2013 | Mudalige |
| 8,489,434 B1 | 7/2013 | Otis et al. |
| 8,583,365 B2 | 11/2013 | Jang et al. |
| 8,660,734 B2 | 2/2014 | Zhu et al. |
| 8,676,466 B2 | 3/2014 | Mudalige |
| 8,678,701 B1 | 3/2014 | Aldasem |
| 8,786,461 B1 | 7/2014 | Daudelin |
| 8,810,392 B1 | 8/2014 | Teller et al. |
| 8,816,857 B2 | 8/2014 | Nordin et al. |
| 8,874,305 B2 | 10/2014 | Dolgov et al. |
| 8,880,270 B1 | 11/2014 | Ferguson et al. |
| 8,892,451 B2 | 11/2014 | Everett |
| 8,903,591 B1 | 12/2014 | Ferguson et al. |
| 8,923,890 B1 | 12/2014 | White et al. |
| 8,924,150 B2 | 12/2014 | Tsimhoni et al. |
| 8,935,034 B1 | 1/2015 | Zhu |
| 8,948,955 B2 | 2/2015 | Zhu et al. |
| 8,949,016 B1 | 2/2015 | Ferguson et al. |
| 8,954,217 B1 | 2/2015 | Montemerlo et al. |
| 8,954,252 B1 | 2/2015 | Urmson et al. |
| 8,954,261 B2 | 2/2015 | Das et al. |
| 8,958,943 B2 | 2/2015 | Bertosa et al. |
| 8,965,621 B1 | 2/2015 | Urmson et al. |
| 8,970,362 B2 | 3/2015 | Morley et al. |
| 8,983,705 B2 | 3/2015 | Zhu et al. |
| 8,996,224 B1 | 3/2015 | Herbach et al. |
| 9,014,905 B1 | 4/2015 | Kretzschmar et al. |
| 9,024,787 B2 | 5/2015 | Alshinnawi et al. |
| 9,123,049 B2 | 9/2015 | Hyde et al. |
| 9,170,327 B2 | 10/2015 | Choe et al. |
| 9,188,985 B1 * | 11/2015 | Hobbs ............... G01C 21/3682 |
| 9,189,897 B1 | 11/2015 | Stenneth |
| 9,194,168 B1 | 11/2015 | Lu et al. |
| 9,216,745 B2 | 12/2015 | Beardsley et al. |
| 9,218,698 B2 | 12/2015 | Ricci |
| 9,286,520 B1 | 3/2016 | Lo et al. |
| 9,317,033 B2 | 4/2016 | Ibanez-guzman et al. |
| 9,381,915 B1 | 7/2016 | Crombez et al. |
| 9,390,451 B1 | 7/2016 | Slusar |
| 9,399,472 B2 | 7/2016 | Minoiu-Enache |
| 9,463,805 B2 | 10/2016 | Kirsch et al. |
| 9,483,948 B1 | 11/2016 | Gordon et al. |
| 9,524,648 B1 | 12/2016 | Gopalakrishnan et al. |
| 9,552,735 B2 | 1/2017 | Pilutti et al. |
| 9,566,958 B2 | 2/2017 | Waldmann |
| 9,566,986 B1 | 2/2017 | Gordon et al. |
| 9,587,952 B1 | 3/2017 | Slusar |
| 9,628,975 B1 | 4/2017 | Watkins et al. |
| 9,646,496 B1 | 5/2017 | Miller |
| 9,718,468 B2 | 8/2017 | Barfield et al. |
| 9,816,827 B1 * | 11/2017 | Slusar .................. G06Q 10/00 |
| 9,834,224 B2 | 12/2017 | Gordon et al. |
| 9,944,291 B2 | 4/2018 | Gordon |
| 10,042,359 B1 | 8/2018 | Konrardy |
| 10,093,322 B2 | 10/2018 | Gordon |
| 2002/0026841 A1 | 3/2002 | Svendsen |
| 2002/0128774 A1 | 9/2002 | Takezaki et al. |
| 2003/0065572 A1 | 4/2003 | McNee et al. |
| 2003/0076981 A1 | 4/2003 | Smith et al. |
| 2004/0078133 A1 | 4/2004 | Miller |
| 2004/0117086 A1 | 6/2004 | Rao et al. |
| 2004/0199306 A1 | 10/2004 | Heilmann et al. |
| 2005/0021227 A1 | 1/2005 | Matsumoto et al. |
| 2005/0104745 A1 | 5/2005 | Bachelder et al. |
| 2006/0106671 A1 | 5/2006 | Biet |
| 2006/0163939 A1 | 7/2006 | Kuramochi et al. |
| 2006/0200379 A1 | 9/2006 | Biet |
| 2006/0241855 A1 | 10/2006 | Joe et al. |
| 2007/0100687 A1 | 5/2007 | Yoshikawa |
| 2007/0124027 A1 | 5/2007 | Betzitza et al. |
| 2007/0265754 A1 | 11/2007 | Curtis et al. |
| 2008/0048850 A1 | 2/2008 | Yamada |
| 2008/0065293 A1 | 3/2008 | Placke et al. |
| 2008/0114663 A1 | 5/2008 | Watkins et al. |
| 2008/0129475 A1 | 6/2008 | Breed et al. |
| 2008/0201217 A1 | 8/2008 | Bader et al. |
| 2008/0288406 A1 * | 11/2008 | Seguin ................ G06Q 30/02 705/50 |
| 2009/0094109 A1 | 4/2009 | Aaronson et al. |
| 2009/0138168 A1 | 5/2009 | Labuhn et al. |
| 2009/0248231 A1 | 10/2009 | Kamiya |
| 2009/0313096 A1 | 12/2009 | Kaga |
| 2010/0057511 A1 | 3/2010 | Mansouri et al. |
| 2010/0156672 A1 | 6/2010 | Yoo et al. |
| 2010/0179720 A1 | 7/2010 | Lin et al. |
| 2010/0228427 A1 | 9/2010 | Anderson et al. |
| 2010/0256852 A1 | 10/2010 | Mudalige |
| 2011/0029173 A1 | 2/2011 | Hyde et al. |
| 2011/0035250 A1 | 2/2011 | Finucan |
| 2011/0077807 A1 | 3/2011 | Hyde et al. |
| 2011/0077808 A1 | 3/2011 | Hyde et al. |
| 2011/0137699 A1 | 6/2011 | Ben-Ari et al. |
| 2011/0264521 A1 | 10/2011 | Straka |
| 2012/0072243 A1 | 3/2012 | Collins et al. |
| 2012/0083960 A1 | 4/2012 | Zhu |
| 2012/0123646 A1 | 5/2012 | Mantini |
| 2012/0139756 A1 | 6/2012 | Djurkovic |
| 2012/0293341 A1 | 11/2012 | Lin |
| 2013/0030657 A1 | 1/2013 | Chatterjee et al. |
| 2013/0113634 A1 | 5/2013 | Hutchinson et al. |
| 2013/0131949 A1 | 5/2013 | Shida |
| 2013/0144502 A1 | 6/2013 | Shida |
| 2013/0231824 A1 | 9/2013 | Wilson et al. |
| 2013/0261871 A1 | 10/2013 | Hobbs et al. |
| 2013/0304513 A1 * | 11/2013 | Hyde ................ G06Q 40/08 705/4 |
| 2013/0304514 A1 * | 11/2013 | Hyde ................ G06Q 40/08 705/4 |
| 2014/0019259 A1 | 1/2014 | Dung et al. |
| 2014/0032049 A1 | 1/2014 | Moshchuk et al. |
| 2014/0092332 A1 | 4/2014 | Price |
| 2014/0095214 A1 | 4/2014 | Mathe et al. |
| 2014/0129073 A1 | 5/2014 | Ferguson |
| 2014/0136045 A1 | 5/2014 | Zhu et al. |
| 2014/0136414 A1 | 5/2014 | Abhyanker |
| 2014/0164126 A1 | 6/2014 | Nicholas et al. |
| 2014/0188999 A1 | 7/2014 | Leonard et al. |
| 2014/0195213 A1 | 7/2014 | Kozloski et al. |
| 2014/0201037 A1 | 7/2014 | Mallawarachchi et al. |
| 2014/0201126 A1 | 7/2014 | Zadeh |
| 2014/0214255 A1 | 7/2014 | Dolgov et al. |
| 2014/0214260 A1 | 7/2014 | Eckert et al. |
| 2014/0222277 A1 | 8/2014 | Tsimhoni et al. |
| 2014/0222577 A1 | 8/2014 | Abhyanker |
| 2014/0282967 A1 | 9/2014 | Maguire |
| 2014/0297116 A1 | 10/2014 | Anderson et al. |
| 2014/0306833 A1 | 10/2014 | Ricci |

(56) References Cited

U.S. PATENT DOCUMENTS

| | | |
|---|---|---|
| 2014/0309789 A1 | 10/2014 | Ricci |
| 2014/0309806 A1 | 10/2014 | Ricci |
| 2014/0309864 A1 | 10/2014 | Ricci |
| 2014/0309891 A1 | 10/2014 | Ricci |
| 2014/0310186 A1 | 10/2014 | Ricci |
| 2014/0316671 A1 | 10/2014 | Okamoto |
| 2014/0324268 A1 | 10/2014 | Montemerlo et al. |
| 2014/0330479 A1 | 11/2014 | Dolgov |
| 2014/0358331 A1 | 12/2014 | Prada Gomez et al. |
| 2014/0358353 A1 | 12/2014 | Ibanez-Guzman et al. |
| 2015/0006005 A1 | 1/2015 | Yu et al. |
| 2015/0006014 A1 | 1/2015 | Wimmer et al. |
| 2015/0026092 A1 | 1/2015 | Abboud et al. |
| 2015/0035685 A1 | 2/2015 | Strickland et al. |
| 2015/0051778 A1 | 2/2015 | Mueller |
| 2015/0057891 A1 | 2/2015 | Mudalige et al. |
| 2015/0062340 A1 | 3/2015 | Datta et al. |
| 2015/0062469 A1 | 3/2015 | Fleury |
| 2015/0066282 A1 | 3/2015 | Yopp |
| 2015/0066284 A1 | 3/2015 | Yopp |
| 2015/0070178 A1 | 3/2015 | Kline |
| 2015/0088358 A1 | 3/2015 | Yopp |
| 2015/0095190 A1 | 4/2015 | Hammad et al. |
| 2015/0097866 A1* | 4/2015 | Mochizuki ............ B60R 11/04 345/633 |
| 2015/0120331 A1 | 4/2015 | Russo et al. |
| 2015/0134178 A1 | 5/2015 | Minoiu-Enache |
| 2015/0137985 A1 | 5/2015 | Zafiroglu et al. |
| 2015/0141043 A1 | 5/2015 | Abramson |
| 2015/0149018 A1 | 5/2015 | Attard et al. |
| 2015/0149021 A1 | 5/2015 | Duncan et al. |
| 2015/0160019 A1 | 6/2015 | Biswal et al. |
| 2015/0166059 A1 | 6/2015 | Ko |
| 2015/0175070 A1 | 6/2015 | Attard et al. |
| 2015/0178998 A1 | 6/2015 | Attard et al. |
| 2015/0187019 A1 | 7/2015 | Fernandes |
| 2015/0193731 A1 | 7/2015 | Stevens et al. |
| 2015/0196256 A1 | 7/2015 | Venkatraman et al. |
| 2015/0210280 A1 | 7/2015 | Agnew et al. |
| 2015/0232065 A1 | 8/2015 | Ricci et al. |
| 2015/0235480 A1* | 8/2015 | Cudak ................. G05D 1/0027 701/2 |
| 2015/0235557 A1 | 8/2015 | Engelman |
| 2015/0242953 A1* | 8/2015 | Suiter .................... G06Q 40/08 705/4 |
| 2015/0248689 A1 | 9/2015 | Paul et al. |
| 2015/0269536 A1 | 9/2015 | Parris |
| 2015/0293994 A1 | 10/2015 | Kelly |
| 2015/0338226 A1 | 11/2015 | Mason et al. |
| 2015/0339639 A1 | 11/2015 | Choe |
| 2015/0348112 A1* | 12/2015 | Ramanujam ....... G06Q 30/0266 705/14.63 |
| 2016/0001781 A1 | 1/2016 | Fung et al. |
| 2016/0026182 A1 | 1/2016 | Boroditsky et al. |
| 2016/0063761 A1 | 3/2016 | Sisbot et al. |
| 2016/0075512 A1 | 3/2016 | Lert, Jr. |
| 2016/0078695 A1 | 3/2016 | McClintic et al. |
| 2016/0078758 A1 | 3/2016 | Basalamah |
| 2016/0090100 A1 | 3/2016 | Oyama et al. |
| 2016/0139594 A1 | 5/2016 | Okumura et al. |
| 2016/0140507 A1 | 5/2016 | Stevens et al. |
| 2016/0176409 A1 | 6/2016 | Kirsch et al. |
| 2016/0187150 A1 | 6/2016 | Sherman et al. |
| 2016/0202700 A1 | 7/2016 | Sprigg |
| 2016/0205146 A1 | 7/2016 | Sugioka et al. |
| 2016/0221768 A1 | 8/2016 | Kadaba |
| 2016/0239798 A1 | 8/2016 | Borley et al. |
| 2016/0303969 A1 | 10/2016 | Akula |
| 2016/0304122 A1 | 10/2016 | Herzog et al. |
| 2016/0334797 A1 | 11/2016 | Ross et al. |
| 2016/0344737 A1 | 11/2016 | Anton |
| 2016/0355192 A1 | 12/2016 | James et al. |
| 2016/0358477 A1 | 12/2016 | Ansari |
| 2016/0364823 A1 | 12/2016 | Cao |
| 2016/0368534 A1 | 12/2016 | Harda |
| 2016/0371977 A1 | 12/2016 | Wingate |
| 2016/0375862 A1 | 12/2016 | Ito et al. |
| 2017/0001650 A1 | 1/2017 | Park |
| 2017/0010613 A1 | 1/2017 | Fukumoto |
| 2017/0021837 A1 | 1/2017 | Ebina |
| 2017/0032585 A1 | 2/2017 | Stenneth |
| 2017/0057542 A1 | 3/2017 | Kim et al. |
| 2017/0061798 A1 | 3/2017 | Linder |
| 2017/0088143 A1 | 3/2017 | Goldman-Shenhar et al. |
| 2017/0106876 A1 | 4/2017 | Gordon et al. |
| 2017/0123428 A1 | 5/2017 | Levinson et al. |
| 2017/0129335 A1 | 5/2017 | Lu |
| 2017/0137023 A1 | 5/2017 | Anderson et al. |
| 2017/0151958 A1 | 6/2017 | Sakuma |
| 2017/0168689 A1 | 6/2017 | Goldman-Shenhar et al. |
| 2017/0200449 A1 | 7/2017 | Penilla et al. |
| 2017/0248949 A1 | 8/2017 | Moran et al. |
| 2017/0300855 A1 | 10/2017 | Lund |
| 2018/0032071 A1 | 2/2018 | Wieneke |
| 2018/0072323 A1 | 3/2018 | Gordon |
| 2018/0075309 A1 | 3/2018 | Sathyanarayana et al. |
| 2018/0086373 A1 | 3/2018 | Tamura |
| 2018/0093631 A1 | 4/2018 | Lee et al. |
| 2018/0108369 A1 | 4/2018 | Gross |
| 2018/0141453 A1 | 5/2018 | High |
| 2018/0154906 A1 | 6/2018 | Dudar |
| 2018/0203455 A1 | 7/2018 | Cronin |
| 2018/0265054 A1 | 9/2018 | Hofmann |
| 2018/0371805 A1 | 12/2018 | Ichinose |

FOREIGN PATENT DOCUMENTS

| | | | |
|---|---|---|---|
| CN | 2349068 Y | 11/1999 | |
| CN | 201004265 Y | 1/2008 | |
| CN | 202012052 | 10/2011 | |
| CN | 202038228 U | 11/2011 | |
| CN | 102650882 | 8/2012 | |
| CN | 202772924 | 3/2013 | |
| CN | 104900018 A | 9/2015 | |
| EP | 0582236 A1 | 2/1994 | |
| EP | 3147180 A1 * | 3/2017 | ........... B62D 15/025 |
| GB | 2498793 A | 7/2013 | |
| WO | 2014058263 A1 | 4/2014 | |
| WO | 2014066721 A2 | 5/2014 | |
| WO | 2014147361 A1 | 9/2014 | |
| WO | 2014148975 A1 | 9/2014 | |
| WO | 2014148976 A1 | 9/2014 | |
| WO | 2015024616 A1 | 2/2015 | |
| WO | 2015056105 A1 | 4/2015 | |
| WO | 2015156146 A1 | 10/2015 | |

OTHER PUBLICATIONS

U.S. Appl. No. 14/887,388, filed October 20, 2015.

Chen S, et al., A Crash Risk Assessment Model for Roas Curves. Inproceedings 20th International Technical Conference on the Enhanced Saftey of Vehicles., 2007. Lyon, France.

T. Vanderbilt, "Let the Robot Drive: The Autonomous Car of the Future Is Here", Wired Magazine, Conde Nast, www.wired.com, Jan. 20, 2012. pp. 1-34.

Gomes, Lee. "Google's Self-Driving Cars Still Face Many Obstacles / MIT Technology Review.", MIT Technology Review. Aug. 28, 2014. Web. <http://www.technologyreview.co,/news/530276/hidden-obstabscles-for-googles-self-driving-cars/>.

Smith, Mark. "Inovations: Emerging Trends in the Wheelchair Market." New Mobility Magazine, Aug. 1, 2014. Web. <http://www.newmobility.com/2014/08/emerging-trends/>.

Crothers, Brooke "Google Now Reporting Self-Driving Car Accidents: Her, It's Not the Car's Fault". forbes.com, Jun. 8, 2015. <http://www.forbes.com/sites/brookecrothers/2015/06/08/google-now-reportibg-driverless-car-Accidents/>.

Anonymous, 'System and Method to Target Advertisements for the Right Focus Group'. ip.com, NO 000218285, May 31, 2012, pp. 1-2.

Anonymous, "Car Built-In Mechanism to Enforce Mandatory Self-Driving Mode", ip.com, No. 000234916, Feb. 14, 2014, pp. 1-3.

(56) References Cited

OTHER PUBLICATIONS

T. Horberry et al., "Driver Distraction: The Effects of Concurrent In-Vehicle Tasks, Road Enviornment Complexity and Age on Driving Performance", Elsevier Ltd., Accident Analysis and Prevention, 38, 2006, pp. 185-191.
J. Miller, "Self-Driving Car Technologu's Benefits, Potential Risks, and Solutions", The Energy Collective, theenergycollective.com, Aug. 19, 2014, pp. 1-7.
J. O'Callaghan, "Inside the Mercedes Self-Guidubg Car That's Built for Luxurious Living in, Not Driving", Associated Newspapers Ltd., Daily Mail, dailymail.com.uk, Jan. 6, 2015, pp. 1-13.
J. Wei et al., "Towards a Viable Autonomous Driving Research Platform", IEEE, Intelegent Vehicles Symposium (IV), 2013, pp. 1-8.
J. Farrier, "Airlines Infuse Their Planes With Smells to Calm You Down", Neatorama, neatorama.com, Mar. 29, 2015, 1 Page.
Anonymous, "Diagnostics Mechanism for Self-Driving Cars to Validate Self-Driving Capabilities", ip.com, Jun. 6, 2014, pp. 1-5. ip.com.
P. Mell et al., "The Nist Definition of Cloud Computing", National Institute of Standards and Technology, Information Technology Laboratory, Sep. 2011, pp. 1-7.
E. Lehrer, "The Insurance Implications of Google's Self-Driving car", Insurance Journal, Right Street Blog, May 28, 2014, pp. 1-2.
Anonymous, "Self-Driving Cars and Insurance", Insurance Information Institute, Inc., Feb. 2015, pp. 1-3.
A. Abkowitz, "Do Self-Driving Cars Spell Doom for Auto Insurers?", Bloomberg L.P., Sep. 10, 2014, pp. 1-2.
X. Jardin, "Terrifying dashcam video captures distracted teen drivers crashing while goofing off", Boing Boing, www.boingboing.net, Mar. 26, 2015, 1 page.
M. Fox, "Self-driving cars safer than those driven by humans: Bob Lutz", CNBC, www.cnbc.com, Sep. 8, 2014, 1 page.
Brownell, "Shared Autonomous Taxi Networks: An Analysis of Transportation Demand in NJ and a 21st Century Solution for Congestion", Dissertation, Princeton University, 2013, pp. 1-122.
Sessa et al., "Blueprint of Alternative City Cyber-Mobility Take-U Scenarios", Seventh Framework Programme Theme SST.2012.3.1-4, Automated Urban Vehicles Collaborative Project—Grant Agreement No. 314190, 2013, pp. 1-63.
Lutin et al., "The Revolutionary Development of Self-Driving Vehicles and Implications for the Transportation Engineering Profession", ITE Journal 83.7, 2013, pp. 28-32.
A. Hars, "Self-Driving Cars: The Digital Transformation of Mobility", Marktplatze Im Umbruch, Springer Berlin Heidelberg, 2015, pp. 539-549.
Jimenez et al.; "Autonomous collision avoidance system based on accurate knowledge of the vehicle surroundings"; Inst Engineering Technology-IET; IET Intelligent Transport Systems vol. 9, No. 1, pp. 105-117; 2015; England.
Anonymous, "Avoiding Crashes With Self-Driving Cars: Today's Crash-Avoidance Systems Are the Mile Markers to Tomorrow's Autonomous Vehicles". Consumer Reports Magazine, Feb. 2014. Web. Sep. 22, 2016. <http://www.consumerreports.org/cro/magazine/2014/04/the-road-to-self-driving-cars/index.htm>.
Anonymous, "Google Files Patent for Second-Gen Autonomous Vehicle Without a Steering Wheel, Brake Pedal & More". patentlymobile.com, Nov. 27, 2015. Web. Sep. 22, 2016. <http://www.patentlymobile.com/2015/11/google-files-patent-for-second-gen-autonomous-vehicle-without-a-steering-wheel-brake-pedal-more.html>.
C. Berger et al., "Cots-Architecture With a Real-Time OS for a Self-Driving Miniature Vehicle", Safecomp 2013—Workshop Ascoms of the 32nd International Conference on Computer Safety, Reliability and Security, Sep. 2013, Toulouse, France, pp. 1-13.
R. Vaidyanathan et al., "A Reflexive Vehicle Control Architecture Based on a Neural Model of the Cockroach Escape Response", Institution of Mechanical Engineers. Journal of Systems and Control Engineering, 2011, vol. 226, No. 5, pp. 699-718.

\* cited by examiner

AUTOMATED INSURANCE TOGGLING FOR SELF-DRIVING VEHICLES

BACKGROUND

The present disclosure relates to the field of vehicles, and specifically to the field of self-driving vehicles. Still more specifically, the present disclosure relates to the field of adjusting insurance coverage for self-driving vehicles.

Self-driving vehicles (SDVs) are vehicles that are able to autonomously drive themselves through private and/or public spaces. Using a system of sensors that detect the location and/or surroundings of the SDV, logic within or associated with the SDV controls the speed, propulsion, braking, and steering of the SDV based on the sensor-detected location and surroundings of the SDV.

SUMMARY

In one or more embodiments of the present invention, a method and/or computer program product automatically toggles insurance policy provisions for a self-driving vehicle (SDV) based on an operational mode of the SDV. One or more processor(s) receive an electronic signal indicating an operational mode of an SDV in real-time, where operational mode is either an autonomous mode or a manual mode. A first insurance policy provision provides coverage while the SDV is operating in the autonomous mode, and a second insurance policy provision provides coverage while the SDV is operating in the manual mode. The processor(s) monitor the SDV for a change in real-time to the operational mode of the SDV. In response to detecting a change in real-time to the operational mode of the SDV, the processor(s) dynamically toggle activation of the first and second insurance policy provisions consistent with the change in real-time to the operational mode of the SDV.

In an embodiment of the present invention, a self-driving vehicle includes a processor, a computer readable memory, and a non-transitory computer readable storage medium. Stored on the non-transitory computer readable storage medium are: first program instructions to receive, from an operational mode device, an electronic signal indicating an operational mode of an SDV in real-time, where operational mode is either an autonomous mode or a manual mode, where a first insurance policy provision provides coverage while the SDV is operating in the autonomous mode, and where a second insurance policy provision provides coverage while the SDV is operating in the manual mode; second program instructions to monitor the SDV for a change in real-time to the operational mode of the SDV; and third program instructions to, in response to detecting a change in real-time to the operational mode of the SDV, dynamically toggle activation of the first and second insurance policy provisions consistent with the change in real-time to the operational mode of the SDV. Thus, the first, second, and third program instructions are stored on the non-transitory computer readable storage medium for execution by one or more processors via the computer readable memory.

DETAILED DESCRIPTION

Figure 1:
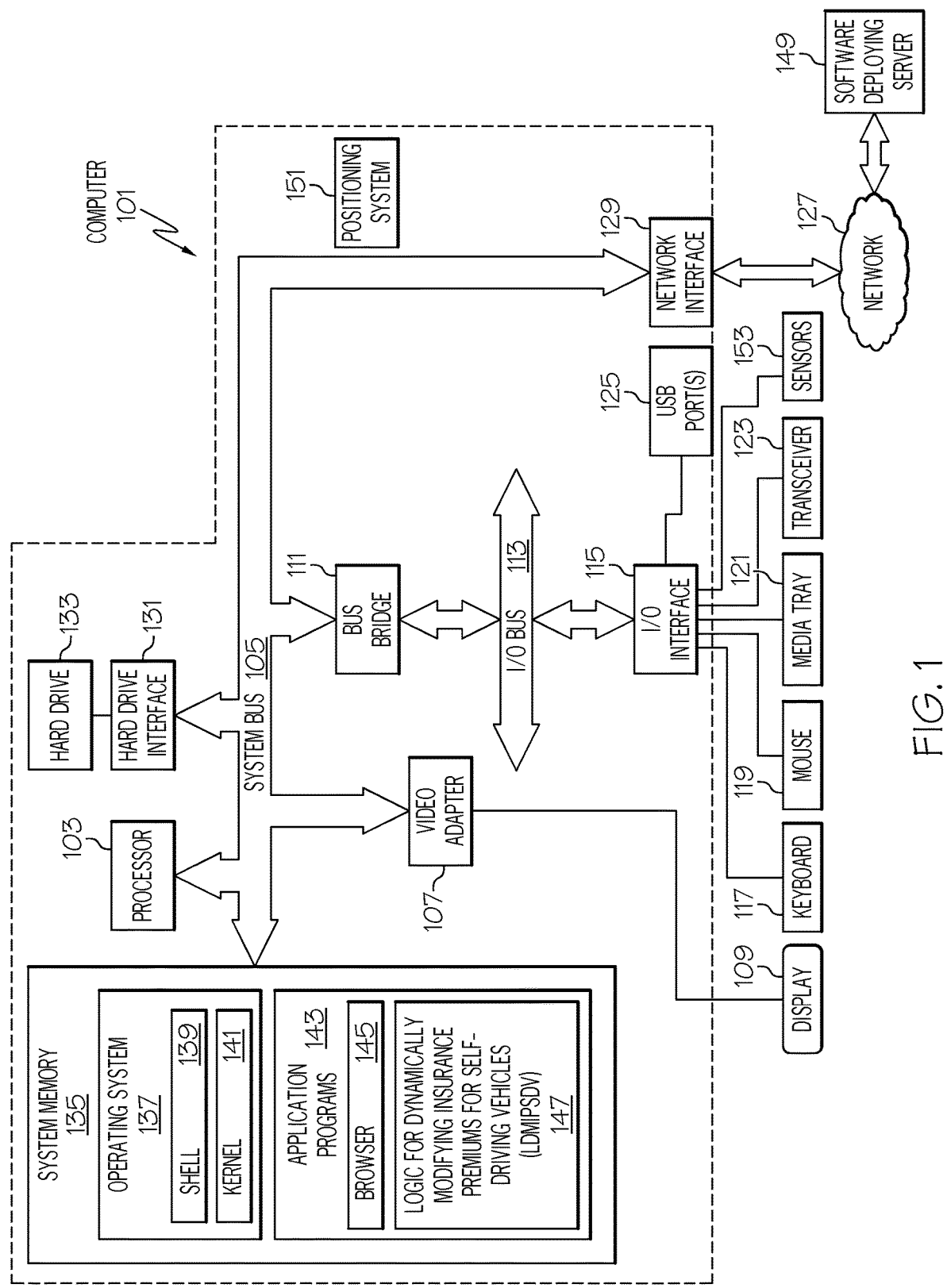
FIG. 1 depicts an exemplary system and network in which the present disclosure may be implemented.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Disclosed herein is a system, method, and computer program product for automatically changing insurance coverage in real time based on the mode a self-driving vehicle (SDV) is currently in. Optionally, the insurance coverage may change based on the present location of the SDV, current traffic conditions, roadway conditions, etc.

In one or more embodiments of the present invention, insurance rebates may be offered depending upon the amount of time a car is in autonomous mode rather than in manual mode, particularly according to the amount of risk mitigated by entering autonomous mode.

In one or more embodiments of the present invention, insurance is purchased in prepaid allotments, and then depleted based on switching the SDV from autonomous (entirely controlled by hardware) mode to a manual (human operated) mode.

Thus, in various embodiments of the present invention, the SDV can operate in autonomous or manual mode. In one embodiment, when the SDV is switched from autonomous mode to manual mode, the pricing/policy for coverage is adjusted to reflect the nominal rate for manual mode. That is, the policy/coverage is toggled from an autonomous mode insurance policy to the manual mode insurance policy for the SDV, and the event is logged.

In various embodiments of the present invention, a report is generated for the driver, insurance company, car owner, rental agency, etc. detailing the switches between autonomous mode and manual mode and the pricing associated with it.

In one embodiment of the present invention, the insurance carrier offers the operator of the SDV an option to select an insurance amount for a specific route or for a trip that may cover one/more destinations. For example, assume that the driver is driving to destination A, which is 300 miles away, and that the driver has paid $10.00 for a special policy covering the SDV just for that trip. Assume further that the policy will charge $0.10/mile while the SDV is operating in manual mode, but will only charge $0.01/mile while the SDV is operating in autonomous mode. If the SDV is operated in manual mode for the entire trip, then the operator will owe an additional $20.00, since 300×$0.10=$30.00 ($20.00 more than the $10.00 paid for the insurance policy). However, if the SDV is operated in autonomous mode for the entire trip, then the operator will receive a rebate/credit of $7.00, since 300×$0.01=$3.00 ($7.00 less than the $10.00 paid for the insurance policy).

However, the operator of the SDV may desire to ride in the SDV while in autonomous mode for some stretches of road (e.g., a boring straight section of interstate highway), but may desire to operate the SDV in manual mode in other stretches of road (e.g., winding roads that allow the operator to enjoy the feel of controlling the SDV). A meter on the SDV or smart phone or other device can display in real time how much money is left on the policy, allowing the operator to adjust the amount of time spent in manual mode. For example, the meter/display may let the operator know that he/she has another 5 minutes of manual mode time left, after which the SDV must run only in autonomous mode until the destination is reached (in order to stay under the $10.00 limit).

In an embodiment of the present invention, an on-board computer on the SDV will calculate a route based on the expected amount of autonomous mode and the expected amount of manual mode that the operator will prefer. That is, assume that the operator has budgeted $10.00 for insurance coverage for the 300 mile trip described above. Assume further that there are two routes available: a first route has 50 miles of road that are conducive to manual driving and 250 miles of road that are conducive to autonomous driving. Using the mileage charges described above ($0.10/mile for manual mode and $0.01/mile for autonomous mode), then a total of $7.50 ($5.00 for the manual mode miles and $2.50 for the autonomous mode miles) will be charged to the policy when taking the first route, such that the operator will owe no surcharge to (and/or may receive a rebate from) the $10.00 paid.

Assume now that the second route has 100 miles of road that are conducive to manual driving and 200 miles of road that are conducive to autonomous driving. Using the same mileage charges described above ($0.10/mile for manual mode and $0.01/mile for autonomous mode), then a total of $12.00 ($10.00 for the manual mode miles and $2.00 for the autonomous mode miles) will be charged to the policy, such that the operator will owe a $2.00 surcharge.

In one embodiment of the present invention, the price of the insurance policy is dynamically adjusted according to the number of passengers in the SDV. For example, assume that a first SDV is transporting 6 passengers and a second SDV is transporting 1 passenger and a third SDV is transporting no passengers. The first SDV poses the greatest exposure to the insurance carrier, since 1) there are more persons in the SDV who may be injured in the event of a collision, and 2) there is a higher likelihood of the driver of the SDV being distracted when operating the SDV in manual mode. The second SDV poses a smaller exposure to the insurance carrier since 1) there are fewer persons in the SDV who may be injured in the event of a collision, and 2) the driver of the SDV has no personal distractions since he/she is the only person in the SDV. The third SDV poses the least amount of exposure to the insurance carrier since 1) the SDV is always operating in autonomous mode, which is historically safer than operating in manual mode, and 2) there are no passengers who could be injured in a collisions.

Thus, the insurance carrier is able to dynamically adjust the pricing of coverage based on the number of passengers in the SDV at any unit of time.

The current invention is not limited to only automobile insurance (i.e., insurance coverage for automotive SDVs). Rather, in one or more embodiments, the present invention applies to insurance coverage for other types of vehicles, including, but not limited to boats, trains, airplanes, etc., all of which can be autonomously driven/flown/operated.

In one embodiment of the present invention, the cost of the insurance policy is further adjusted (beyond whether the SDV is in autonomous mode or manual mode) based on a driver profile (e.g., history of accidents, etc.), current traffic conditions (e.g., "light", "heavy", "speeding", etc.), road conditions (e.g., weather, construction, potholes, etc.), light conditions (e.g., bright conditions during daylight hours versus dark conditions during nighttime hours and/or heavy cloud cover), and other occupants in the SDV (persons and/or pets who may be distracting to the designated driver of the SDV if in manual mode).

Real-time alerts may be provided to the occupant(s) of the SDV via a display within the SDV cabin or on a communication device (e.g., a "smart phone") in the possession of a passenger in the SDV. These real-time alerts can show 1) the price difference between driving in manual or autonomous mode, 2) how much money is left in a short-term (e.g., single trip) policy, and/or 3) recommendations regarding which mode (manual or autonomous) is best suited for staying within the monetary limit (i.e., premium paid for coverage) of the insurance policy. These real-time alerts may be provided (1) at the start of a given trip (i.e., when the car is first started), (2) at the end of a given trip (i.e., when the car is shut off), or (3) dynamically during a given trip (i.e., when the on-board computer determines that the SDV is in a location in which it can be driven automatically). That is, in (3), there may be times in which autonomous driving is prohibited/blocked (e.g., in areas in which GPS coverage is spotty, in heavy traffic areas in which most of the other vehicles are not autonomous-enabled, etc.).

In an embodiment of the present invention, active learning is employed so that the system as a whole learns from the experiences of many SDVs and challenges of using driving modes, in different geographies and among cohorts. Geographies may include cities, rural areas, and the like. Cohorts may include people with certain characteristics, traits, etc. That is, the system will evaluate the safety record of SDVs when using autonomous or manual modes of operation in a certain location, for certain times, etc. If the safety history indicates that autonomous mode is safer (i.e., has fewer collisions or other mishaps than when in manual mode) under such conditions, then the on-board computer on the SDV will suggest, or automatically engage, the autonomous mode for the SDV while under these conditions. However, if the safety history indicates that manual mode is safer (than autonomous mode) under such conditions, then the on-board computer on the SDV is blocked from engaging the autonomous mode for the SDV under these conditions.

In one or more embodiments of the present invention, a weighted voting system is used to weight the various variables used in making the decision regarding insurance parameters and which mode (autonomous or manual) to use. That is, besides adjusting the mode setting to autonomous or manual based on the cost of the insurance premium for each mode, the decision to use autonomous or manual mode may be further determined by real-time safety factors, such as the presence of pedestrians on or near the roadway upon which the SDV is traveling, the movement (e.g., erratic, smooth, stop-and-go, speeding, etc.) of other vehicles that are sharing the roadway with the SDV, etc. Such weighted voting approaches may be characterized primarily by three aspects -- the inputs, the weights, and the quota. The inputs are (I1, I2, . . . , IN). N denotes the total number of inputs. A input's weight (w) is the number of "votes" associated with the input. The quota (q) is the minimum number of votes required to "pass a motion," which in this case refers primarily to a decision made to place the SDV in autonomous or manual mode.

Note that the present invention does not merely set insurance premiums based on static issues regarding the insured driver (e.g., the driving history, age, etc. of the insured). Rather, the present invention dynamically sets premium levels based on real-time conditions, including whether an SDV is in manual mode or autonomous mode. Thus the insurance carrier and the insured driver are able to fine-tune the premium cost that is actuarially sound, both for the insurance carrier and the insured.

As such, the present invention links the operational mode (autonomous or manual) of the SDV to the type/cost of insurance coverage, as described herein.

In an embodiment of the present invention, enablement of the operational mode used by the SDV may be under the control of the carrier. For example, assume that an insurance policy excludes coverage for an SDV if it is operated in manual mode while driving through a school zone. An insurance computer (e.g., insurance provider computer 201 shown in FIG. 2) is enabled to send a signal to the SDV 202 that automatically places SDV 202 into autonomous mode while driving through a school zone. In one or more embodiments, this feature is achieved by the insurance company broadcasting (e.g., via a cellular network) the vehicle identification number (VIN) of the vehicle and the policy coverage parameters. The SDV receives this broadcast, recognizes its VIN, and maps the coverage parameters to mode availability parameters.

In an embodiment, the insurance provider computer 201 automatically changes the premium amount if an unauthorized person is driving the SDV 202. That is, using facial recognition software, an on-board camera (e.g., one of the sensors 153 in FIG. 1, when incorporated into the architecture for SDV on-board computer 301 in FIG. 3) captures images of passengers in the cabin of the SDV 202. If a person other than the insured is sitting in the "driver's seat" at the controls of the SDV 202, and the SDV 202 is in manual mode, then the insurance provider computer 201 will implement a condition in the insurance policy that charges a higher rate for unlisted/unauthorized/undeclared drivers.

In an embodiment of the present invention, if no passengers are within the SDV while the SDV is traveling (i.e., is in full autonomous mode and is not transporting any passengers), then there is no need for personal injury coverage for occupants of the SDV (since the SDV has no occupants). Thus, in this embodiment sensors (e.g., cabin cameras, pressure sensors on seats in the SDV cabin, carbon dioxide and/or humidity detectors capable of detecting exhaled air, etc.) in the SDV cabin can detect that the SDV has no passengers. Based on this detection, the insurance premium charge is reduced, thus taking off personal injury coverage for occupants of the SDV while the SDV has no passengers in transit. Once a passenger enters the cabin of the SDV, then the system will revert to personal injury coverage for the passenger, and will adjust the insurance premium accordingly.

With reference now to the figures, and in particular to FIG. 1, there is depicted a block diagram of an exemplary system and network that may be utilized by and/or in the implementation of the present invention. Some or all of the exemplary architecture, including both depicted hardware and software, shown for and within computer 101 may be utilized by software deploying server 149 shown in FIG. 1, and/or insurance provider computer 201 shown in FIG. 2, and/or a self-driving vehicle (SDV) on-board computer 301 shown in FIG. 3.

Exemplary computer 101 includes a processor 103 that is coupled to a system bus 105. Processor 103 may utilize one or more processors, each of which has one or more processor cores. A video adapter 107, which drives/supports a display 109, is also coupled to system bus 105. System bus 105 is coupled via a bus bridge 111 to an input/output (I/O) bus 113. An I/O interface 115 is coupled to I/O bus 113. I/O interface 115 affords communication with various I/O devices, including a keyboard 117, a mouse 119, a media tray 121 (which may include storage devices such as CD-ROM drives, multi-media interfaces, etc.), a transceiver 123 (capable of transmitting and/or receiving electronic communication signals), and external USB port(s) 125. While the format of the ports connected to I/O interface 115 may be any known to those skilled in the art of computer architecture, in one embodiment some or all of these ports are universal serial bus (USB) ports.

As depicted, computer 101 is able to communicate with a software deploying server 149 and/or other devices/systems (e.g., establishing communication among SDV 202 and insurance provider computer 201 depicted in the figures below) using a network interface 129. Network interface 129 is a hardware network interface, such as a network interface card (NIC), etc. Network 127 may be an external network such as the Internet, or an internal network such as an Ethernet or a virtual private network (VPN). In one or more embodiments, network 127 is a wireless network, such as a Wi-Fi network, a cellular network, etc.

A hard drive interface 131 is also coupled to system bus 105. Hard drive interface 131 interfaces with a hard drive 133. In one embodiment, hard drive 133 populates a system memory 135, which is also coupled to system bus 105. System memory is defined as a lowest level of volatile memory in computer 101. This volatile memory includes additional higher levels of volatile memory (not shown), including, but not limited to, cache memory, registers and buffers. Data that populates system memory 135 includes computer 101's operating system (OS) 137 and application programs 143.

OS 137 includes a shell 139, for providing transparent user access to resources such as application programs 143. Generally, shell 139 is a program that provides an interpreter and an interface between the user and the operating system. More specifically, shell 139 executes commands that are entered into a command line user interface or from a file. Thus, shell 139, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 141) for processing. While shell 139 is a text-based, line-oriented user interface, the present invention will equally well support other user interface modes, such as graphical, voice, gestural, etc.

As depicted, OS 137 also includes kernel 141, which includes lower levels of functionality for OS 137, including providing essential services required by other parts of OS 137 and application programs 143, including memory management, process and task management, disk management, and mouse and keyboard management.

Application programs 143 include a renderer, shown in exemplary manner as a browser 145. Browser 145 includes program modules and instructions enabling a world wide web (WWW) client (i.e., computer 101) to send and receive network messages to the Internet using hypertext transfer protocol (HTTP) messaging, thus enabling communication with software deploying server 149 and other systems.

Application programs 143 in computer 101's system memory (as well as software deploying server 149's system memory) also include Logic for Dynamically Modifying Insurance Premiums for Self-Driving Vehicles (LDMIPSDV) 147. LDMIPSDV 147 includes code for implementing the processes described below, including those described in FIGS. 2-4. In one embodiment, computer 101 is able to download LDMIPSDV 147 from software deploying server 149, including in an on-demand basis, wherein the code in LDMIPSDV 147 is not downloaded until needed for execution. In one embodiment of the present invention, software deploying server 149 performs all of the functions associated with the present invention (including execution of LDMIPSDV 147), thus freeing computer 101 from having to use its own internal computing resources to execute LDMIPSDV 147.

Also within computer 101 is a positioning system 151, which determines a real-time current location of computer 101 (particularly when part of an emergency vehicle and/or a self-driving vehicle as described herein). Positioning system 151 may be a combination of accelerometers, speedometers, etc., or it may be a global positioning system (GPS) that utilizes space-based satellites to provide triangulated signals used to determine two-dimensional or three-dimensional locations.

Also associated with computer 101 are sensors 153, which detect an environment of the computer 101. More specifically, sensors 153 are able to detect vehicles, road obstructions, pavement, etc. For example, if computer 101 is on board a self-driving vehicle (SDV), then sensors 153 may be cameras, radar transceivers, etc. that allow the SDV to detect the environment (e.g., other vehicles including erratically driven vehicles as described herein, road obstructions, pavement, etc.) of that SDV, thus enabling it to be autonomously self-driven. Similarly, sensors 153 may be cameras, thermometers, moisture detectors, etc. that detect ambient weather conditions and other environmental conditions of a roadway upon which the SDV is traveling.

The hardware elements depicted in computer 101 are not intended to be exhaustive, but rather are representative to highlight essential components required by the present invention. For instance, computer 101 may include alternate memory storage devices such as magnetic cassettes, digital versatile disks (DVDs), Bernoulli cartridges, and the like. These and other variations are intended to be within the spirit and scope of the present invention.

Figure 2:
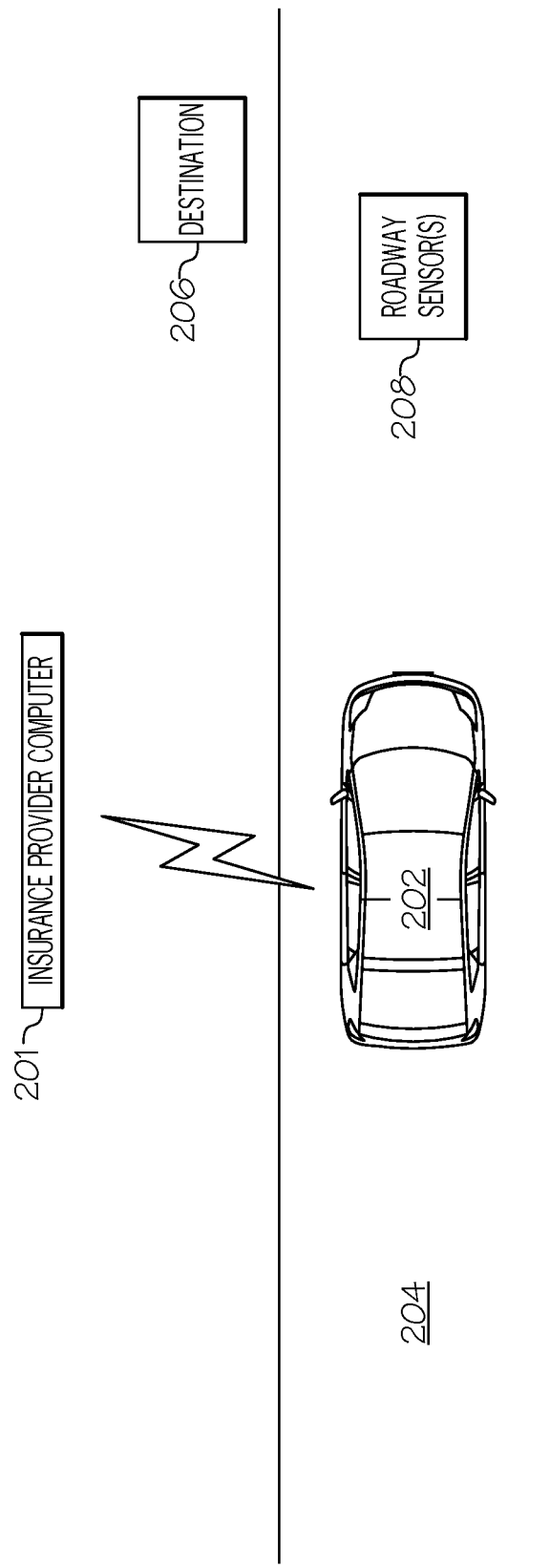
FIG. 2 illustrates a communication linkage between an exemplary self-driving vehicle (SDV) and an insurance provider computer.

With reference now to FIG. 2, a self-driving vehicle (SDV) 202 is depicted traveling on a roadway 204 towards a destination 206. SDV 202 is able to wirelessly communicate (e.g., via a cellular network) with an insurance provider computer 201, which modifies insurance premiums for SDV 202 in accordance with one or more embodiments/scenarios presented herein.

Roadway sensor(s) 208 are positioned on or near roadway 204 to detect real-time conditions of roadway 204. Roadway sensor(s) 208 are mechanical, visual, and/or electrical sensors that are able to detect the number and speed of vehicles traveling on the roadway 204, the amount and/or type of precipitation on the roadway 204, the temperature of the roadway 204 and/or ambient air around the roadway 204, the movement of vehicles traveling along roadway 204, etc.

Figure 3:
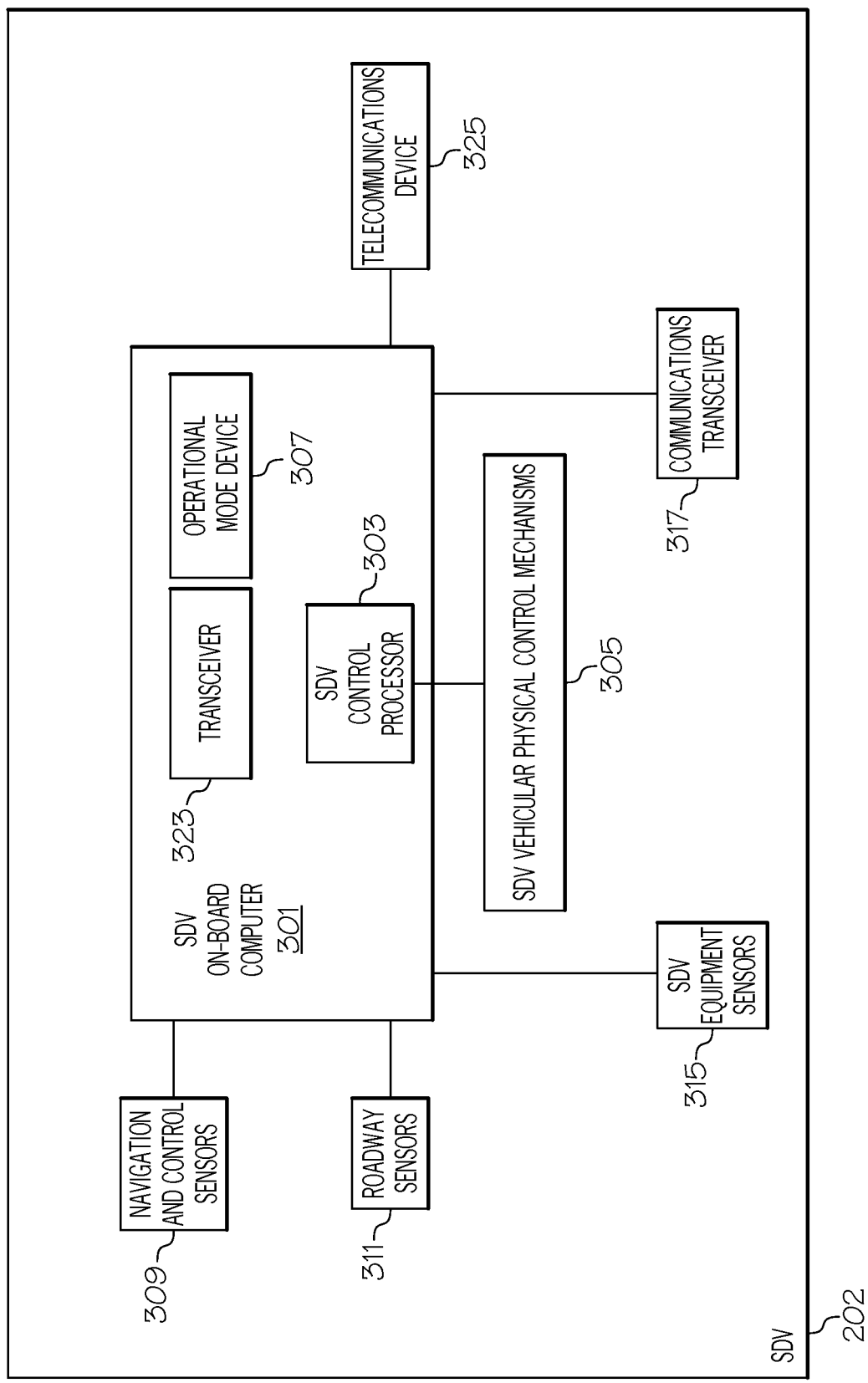
FIG. 3 depicts additional detail of control hardware within an SDV.

With reference now to FIG. 3, additional details of one or more embodiments of the SDV 202 are presented. As shown in FIG. 3, SDV 202 has an SDV on-board computer 301 that controls operations of the SDV 202. According to directives from a operational mode device 307, the SDV 202 can be selectively operated in manual mode or autonomous mode. In a preferred embodiment, operational mode device 307 is a dedicated hardware device that selectively directs the SDV on-board computer 301 to operate the SDV 202 in the autonomous mode or in the manual mode.

While in autonomous mode, SDV 202 operates without the input of a human driver, such that the engine, steering mechanism, braking system, horn, signals, etc. are controlled by the SDV control processor 303, which is now under the control of the SDV on-board computer 301. That is, by the SDV on-board computer 301 processing inputs taken from navigation and control sensors 309 and the operational mode device 307 (indicating that the SDV 202 is to be controlled autonomously), then driver inputs to the SDV control processor 303 and/or SDV vehicular physical control mechanisms 305 are no longer needed.

As just mentioned, the SDV on-board computer 301 uses outputs from navigation and control sensors 309 to control the SDV 202. Navigation and control sensors 309 include hardware sensors that 1) determine the location of the SDV 202; 2) sense other cars and/or obstacles and/or physical structures around SDV 202; 3) measure the speed and direction of the SDV 202; and 4) provide any other inputs needed to safely control the movement of the SDV 202.

With respect to the feature of 1) determining the location of the SDV 202, this can be achieved through the use of a positioning system such as positioning system 151 shown in FIG. 1. Positioning system 151 may use a global positioning system (GPS), which uses space-based satellites that provide positioning signals that are triangulated by a GPS receiver to determine a 3-D geophysical position of the SDV 202. Positioning system 151 may also use, either alone or in conjunction with a GPS system, physical movement sensors such as accelerometers (which measure rates of changes to a vehicle in any direction), speedometers (which measure the instantaneous speed of a vehicle), airflow meters (which measure the flow of air around a vehicle), etc. Such physical movement sensors may incorporate the use of semiconductor strain gauges, electromechanical gauges that take readings from drivetrain rotations, barometric sensors, etc.

With respect to the feature of 2) sensing other cars and/or obstacles and/or physical structures around SDV 202, the positioning system 151 may use radar or other electromagnetic energy that is emitted from an electromagnetic radiation transmitter (e.g., transceiver 323 shown in FIG. 3), bounced off a physical structure (e.g., another car), and then received by an electromagnetic radiation receiver (e.g., transceiver 323). By measuring the time it takes to receive back the emitted electromagnetic radiation, and/or evaluating a Doppler shift (i.e., a change in frequency to the electromagnetic radiation that is caused by the relative movement of the SDV 202 to objects being interrogated by the electromagnetic radiation) in the received electromagnetic radiation from when it was transmitted, the presence and location of other physical objects can be ascertained by the SDV on-board computer 301.

With respect to the feature of 3) measuring the speed and direction of the SDV 202, this can be accomplished by taking readings from an on-board speedometer (not depicted) on the SDV 202 and/or detecting movements to the steering mechanism (also not depicted) on the SDV 202 and/or the positioning system 151 discussed above.

With respect to the feature of 4) providing any other inputs needed to safely control the movement of the SDV 202, such inputs include, but are not limited to, control signals to activate a horn, turning indicators, flashing emergency lights, etc. on the SDV 202.

In one or more embodiments of the present invention, SDV 202 includes roadway sensors 311 that are coupled to the SDV 202. Roadway sensors 311 may include sensors that are able to detect the amount of water, snow, ice on the roadway 204 (e.g., using cameras, heat sensors, moisture sensors, thermometers, etc.). Roadway sensors 311 also include sensors that are able to detect "rough" roadways (e.g., roadways having potholes, poorly maintained pavement, no paving, etc.) using cameras, vibration sensors, etc.

Roadway sensors 311 may also include sensors that are also able to detect how dark the roadway 204 is using light sensors.

In one or more embodiments of the present invention, also within the SDV 202 are SDV equipment sensors 315. SDV equipment sensors 315 may include cameras aimed at tires on the SDV 202 to detect how much tread is left on the tire. SDV equipment sensors 315 may include electronic sensors that detect how much padding is left of brake calipers on disk brakes. SDV equipment sensors 315 may include drivetrain sensors that detect operating conditions within an engine (e.g., power, speed, revolutions per minute—RPMs of the engine, timing, cylinder compression, coolant levels, engine temperature, oil pressure, etc.), the transmission (e.g., transmission fluid level, conditions of the clutch, gears, etc.), etc. SDV equipment sensors 315 may include sensors that detect the condition of other components of the SDV 202, including lights (e.g., using circuitry that detects if a bulb is broken), wipers (e.g., using circuitry that detects a faulty wiper blade, wiper motor, etc.), etc.

In one or more embodiments of the present invention, also within SDV 202 is a communications transceiver 317, which is able to receive and transmit electronic communication signals (e.g., RF messages) from and to other communications transceivers found in other vehicles, servers, monitoring systems, etc.

In one or more embodiments of the present invention, also within SDV 202 is a telecommunication device 325 (e.g., a smart phone, a cell phone, a laptop computer, etc.), which may be connected (e.g., via a near field communication—NFC connection) to the SDV on-board computer 301. Thus, alerts regarding changes to insurance premiums (as described herein) may be to a smart phone within the SDV 202.

Figure 4:
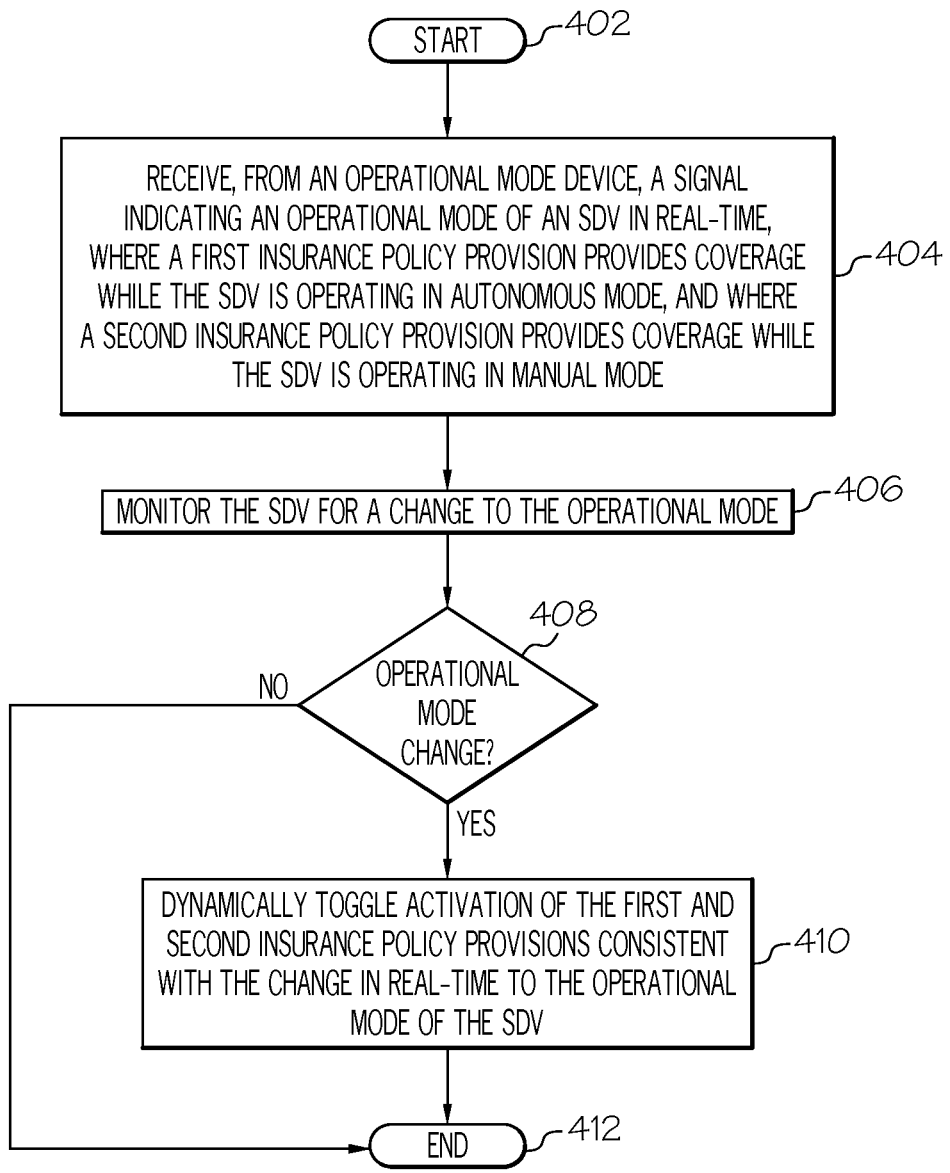
FIG. 4 is a high-level flow chart of one or more steps performed by one or more processors and/or other hardware devices to automatically toggle insurance coverage for a self-driving vehicle (SDV) based on an operational mode of the SDV in accordance with one or more embodiments of the present invention.

With reference now to FIG. 4, a high-level flow chart of one or more steps performed by one or more processors and/or other hardware devices to automatically toggle insurance coverage for a self-driving vehicle (SDV) based on an operational mode of the SDV in accordance with one or more embodiments of the present invention is presented.

After initiator block 402, one or more processors (e.g., within insurance provider computer 201 shown in FIG. 2) receive an electronic signal indicating an operational mode of an SDV in real-time, as described in block 404. The operational mode of the SDV may be manual mode (in which a driver controls some or all of the inputs required to operate the SDV) or autonomous mode (in which the SDV is operated without any inputs from the driver).

If the SDV is in autonomous mode, then a first insurance policy provision is in force (in effect). If the SDV is in manual mode, then a second insurance policy provision is in place (in effect). That is, when operating in autonomous mode, a first provision of the insurance policy will provide certain coverages, certain pricing, etc. As described above, the price per mile of driving may be a certain price (e.g., $0.01/mile), there may or may not be coverage for occupants of the SDV (e.g., when the SDV is devoid of passengers), etc. As described above, often the cost of insurance coverage is cheaper when the SDV is operating in autonomous mode than when the SDV is operating in manual mode.

Thus, if the SDV is in manual mode, then a second insurance policy provision is in force (in effect). This manual policy often will be more expensive, as described above.

The "first insurance policy provision" and "second insurance policy provision" may be in the form of separately issued insurance policies, or they may be sub-components ("provisions") of a single insurance policy.

As described in block 406, the processor(s) monitor the SDV for a change to the operational mode in real-time (i.e., going from autonomous mode to manual mode, or going from manual mode to autonomous mode).

As shown in query block 408, a determination is made as to whether there has been a change to the operational mode under which the SDV is operating.

If there has been a change in the operational mode under which the SDV is operating (as indicated by a signal from the SDV on-board computer 301 and/or operational mode device 307 within the SDV as shown in FIG. 3), then one or more processors (e.g., with the insurance provider computer 201 shown in FIG. 2) will dynamically toggle activation of the first and second insurance policy provisions (often with a change to the price of the premium charged for the insurance coverage) consistent with the change in real-time to the operational mode of the SDV, as described in block 410.

The flow chart ends at terminator block 412.

In one embodiment of the present invention, the insurance policy provisions (and/or pricing of the insurance coverage) are based on how many persons, if any, are in the SDV at any point in time. That is, if there are no passengers in the SDV, then there is no need for personal injury coverage for passengers of the SDV, since there are no passengers in the SDV. Similarly, if there is only one passenger in the SDV, then there is less exposure to the carrier for a personal injury claim by the single passenger than if there were six passengers in the SDV, since there is six-times more exposure with six passengers than with one passenger. Similarly, if there are numerous persons (and/or pets) in the SDV, then the driver of the SDV is likely to be distracted while operating the SDV in manual mode, thus providing more exposure to the insurance carrier than if there were only one or two passengers in the SDV.

Thus, in one embodiment of the present invention, processors (e.g., within the insurance provider computer 201 shown in FIG. 1) receive a sensor signal from one or more sensors within the SDV indicating a quantity of passengers in the SDV. Such sensors may be a cabin camera, a biometric sensor, a microphone, or any other type of sensor capable of detecting the presence of one or more passengers (and/or animals) within the cabin of the SDV. Based on the quantity of passengers in the SDV, the processor(s) then modify insurance coverage (e.g., activate a provision in the insurance policy for multiple passengers, with an accompanying increase in premium) for the SDV. Thus, the modified insurance coverage is effective only while the quantity of passengers indicated by the sensor signal are in the SDV.

In an embodiment of the present invention, the insurance carrier (i.e., the enterprise that issues and services insurance policies) is able to dynamically adjust the cost of insurance (i.e., the premium charged, where "premium" is defined as a fee paid for insurance coverage) based on current road conditions. That is, the present invention allows the insurance carrier to monitor real-time conditions of a roadway upon which the SDV is traveling. If the roadway is dry, has sparse traffic, has no potholes, etc., then the risk of loss to the insurance carrier (caused by a mishap with the SDV) is less than if the roadway were wet, crowded, replete with potholes, etc. Thus, the price of coverage can be dynamically adjusted such that the insured (owner of the SDV) is paying only for coverage needed, and the insurance carrier is charging an amount deemed actuarially necessary. Thus, in this embodiment one or more processors (e.g., in the insurance provider computer 201 in FIG. 2) receive a real-time physical condition of a roadway (e.g., roadway 204) upon which the SDV is traveling from one or more roadway sensors (e.g., roadway sensor(s) 208 in FIG. 2 and/or roadway sensors 311 in FIG. 3). The processor(s) then modify (increase or decrease) a price of the insurance coverage for the SDV based on the real-time physical condition of the roadway, such that the modified insurance coverage price is effective only while the real-time physical condition of the roadway exists, thereby providing a fully equitable condition for both the SDV operator/owner and the insurance carrier.

In an embodiment of the present invention, the insurance carrier, with permission from the owner/operator of the SDV, takes control over where the SDV operates. That is, assume that the insurance carrier has determined that SDVs are safer when operating in autonomous mode as compared to when they operate in manual mode. As such, the insurance carrier would prefer that the SDV operate in areas where autonomous mode is permitted (e.g., an Interstate highway) rather than where autonomous mode is not permitted or possible (e.g., in a school zone or in an area that has spotty GPS coverage). Thus, the insurance carrier can (again, with the permission of the owner/operator of the SDV) redirect which route the SDV takes based on the amount of distance that autonomous driving is allowed.

For example, assume that the SDV is going to a destination that is 100 miles away. Assume further that there are two routes to the destination. A first route has 80 miles of roadway that permit autonomous driving, while the second route has only 30 miles of roadway that permit autonomous driving. Thus, the insurance carrier will send a signal (e.g., to the SDV on-board computer 301 shown in FIG. 3) directing the SDV to take the first route.

Thus, in this embodiment, one or more processors (e.g., within the insurance provider computer 201 shown in FIG. 2) identify a first route to a destination and a second route to the destination to which the SDV is traveling. The processor(s) identify distances on the first route and the second route where operation of the SDV in autonomous mode is permitted, and determine that the first route has more distances where operation of the SDV is permitted in autonomous mode than the second route. Based on this determination, a message transmitter (e.g., transceiver 123 shown in FIG. 1 when incorporated into insurance provider computer 201 shown in FIG. 2) transmits an electronic instruction to an SDV on-board computer (e.g., SDV on-board computer 301 shown in FIG. 3) on the SDV to drive the SDV to the destination using the first route.

In an embodiment of the present invention, the decision of whether to place the SDV in manual or autonomous mode is not only based on the amount of insurance premium that will be owed/charged, but is also on the competence of the driver. That is, in one embodiment of the present invention assume that the SDV is traveling on a roadway (e.g., roadway 204 shown in FIG. 2). One or more processors (e.g., within insurance provider computer 201) retrieve driver profile information about the human driver of the SDV, and then assign the human driver of the SDV to a cohort of drivers traveling on the roadway in multiple SDVs (where the human driver of the SDV shares more than a predetermined quantity of traits with members of the cohort of drivers). The processor(s) retrieve traffic pattern data for the multiple SDVs occupied by the cohort of drivers traveling on the roadway, and examine that traffic pattern data to determine a first traffic flow of the multiple SDVs occupied by members of the cohort of drivers (where the multiple SDVs in the first traffic flow are operating in the autonomous mode on the roadway) and a second traffic flow of the multiple SDVs occupied by members of the cohort of drivers (where the multiple SDVs in the second traffic flow are operating in the manual mode on the roadway). In response to determining that the first traffic flow has a lower accident rate than the second traffic flow, the processor(s) prohibit the SDV from operating in the manual mode.

For example, assume that a particular driver/occupant of an SDV has a characteristic (e.g., a history of traffic accidents while driving a vehicle in manual mode) found in other members of a cohort of drivers. Assume further that historical data shows that these cohort members have a history of accidents that is greater than that of on-board SDV control processors. Thus, if a particular driver matches up with the features found in members of this cohort, an assumption is made that this particular driver too is not as skilled as the on-board SDV control processor. As such, the control of the SDV is required to stay in autonomous mode, and is prohibited from switching to manual mode.

Thus, in this embodiment in which the SDV is traveling on a roadway such as roadway 204, one or more processors (e.g., within insurance provider computer 201) retrieve driver profile information about a human driver of the SDV, and then assign that human driver (of the SDV) to a cohort of drivers traveling on the roadway in multiple SDVs, where the human driver of the SDV shares more than a predetermined quantity of traits with members of the cohort of drivers. The processor(s) retrieve traffic pattern data for the multiple SDVs occupied by the cohort of drivers traveling on the roadway, and then examine the traffic pattern data to determine a first traffic flow of the multiple SDVs occupied by members of the cohort of drivers (where the multiple SDVs in the first traffic flow are operating in the autonomous mode on the roadway) and a second traffic flow of the multiple SDVs occupied by members of the cohort of drivers (where the multiple SDVs in the second traffic flow are operating in manual mode on the roadway). In response to determining that the first traffic flow has a lower accident rate than the second traffic flow, the processor(s) prohibit the SDV from operating in manual mode by transmitting a control signal to an SDV on-board computer and/or an operational mode device (e.g., SDV on-board computer 301 and/or operational mode device 307 shown in FIG. 3) on the SDV directing the SDV on-board computer/operational mode device to operate the SDV only in autonomous mode.

In an embodiment of the present invention, the insurance carrier (which is able to monitor real-time conditions of the SDV via its insurance provider computer 201 shown in FIG. 2) is able to dynamically adjust premiums based on real-time conditions of the SDV. For example, if the SDV is in excellent condition, the insurance carrier can afford to charge a lower premium than if the SDV has serious equipment problems (e.g., bald tires, worn out brake linings, burned out running lights, etc.). Thus, if sensor readings from the SDV are sent to the insurance provider computer informing the insurance carrier of such problems, then the insurance carrier can dynamically adjust the premium cost. Similarly, the dynamic adjustment to the premium cost and/or implementation of policy provisions as described herein can be executed by computing logic within the SDV itself, in order to relieve the insurance carrier of this administrative burden.

Therefore, in this embodiment of the present invention one or more processors (e.g., within insurance provider computer 201) receive operational readings from one or more operational sensors on the SDV (e.g., SDV equipment sensors 315 shown in FIG. 3) that detect a current state of mechanical equipment on the SDV. Based on received operational readings, the processor(s) detect a mechanical fault with the mechanical equipment on the SDV, and then modify a price of the insurance coverage for the SDV while the mechanical fault exists.

In one or more embodiments, the present invention is implemented in a cloud environment. It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
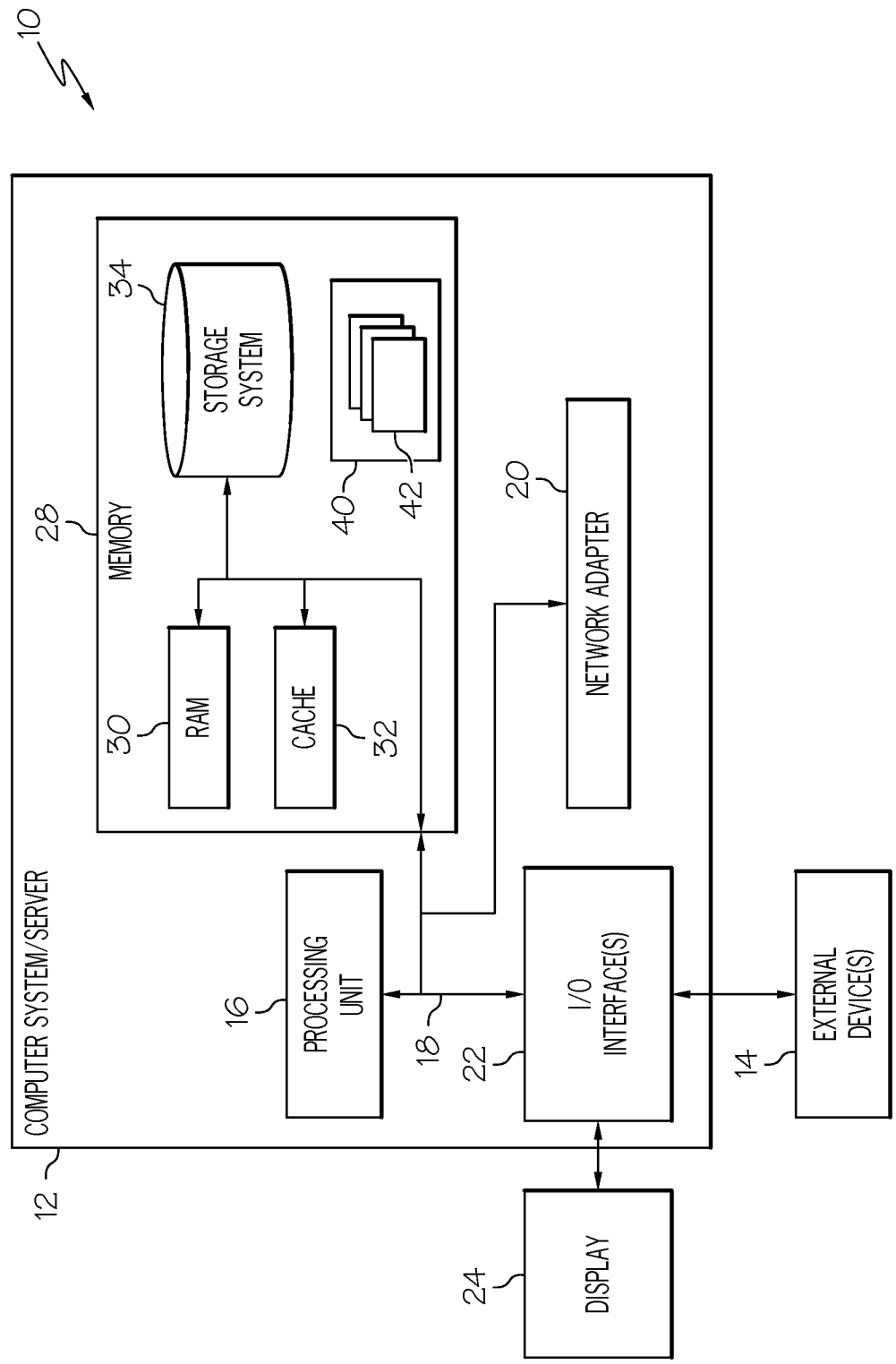
FIG. 5 depicts a cloud computing node according to an embodiment of the present disclosure.

Referring now to FIG. 5, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 6:
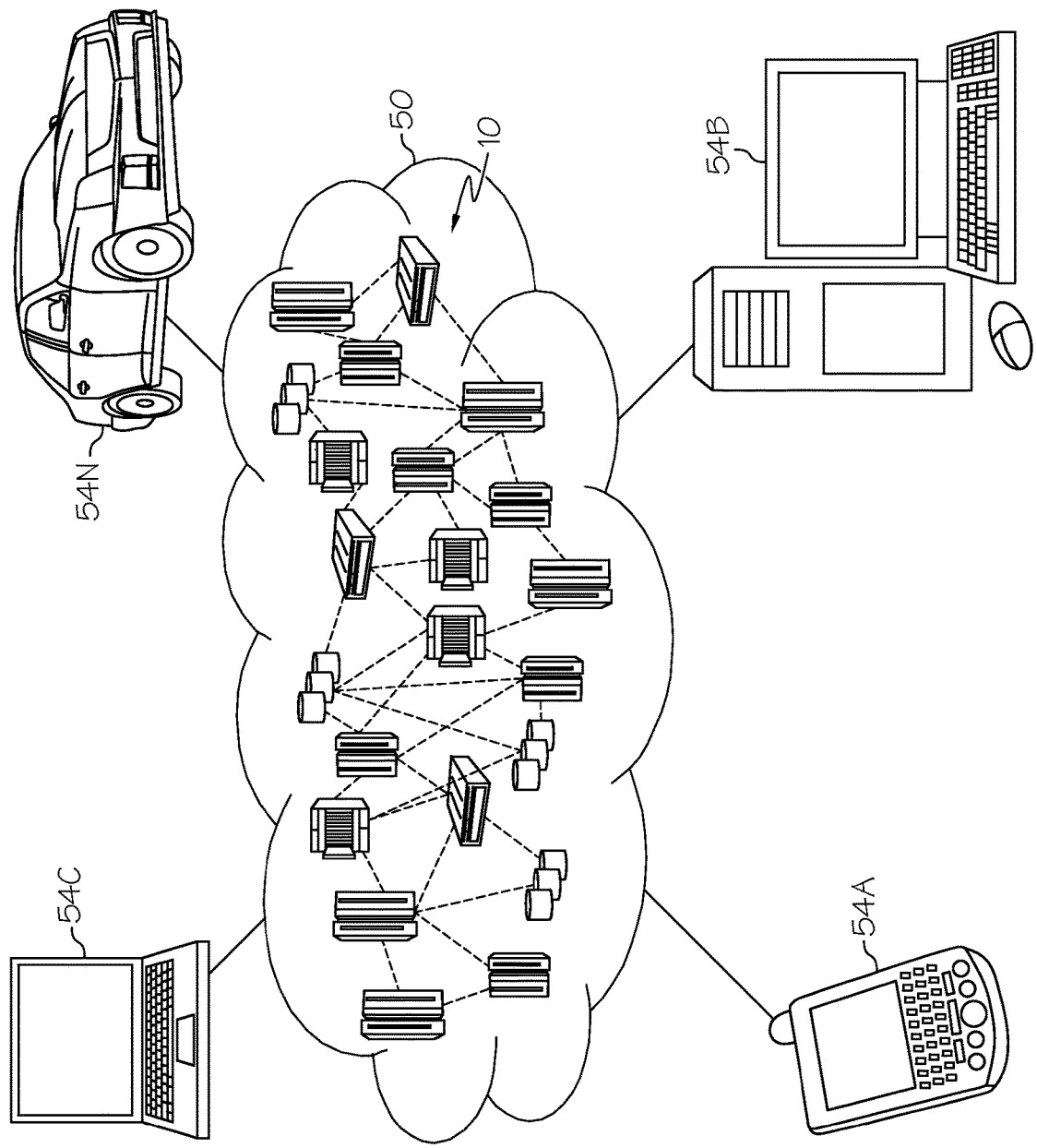
FIG. 6 depicts a cloud computing environment according to an embodiment of the present disclosure.

Referring now to FIG. 6, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
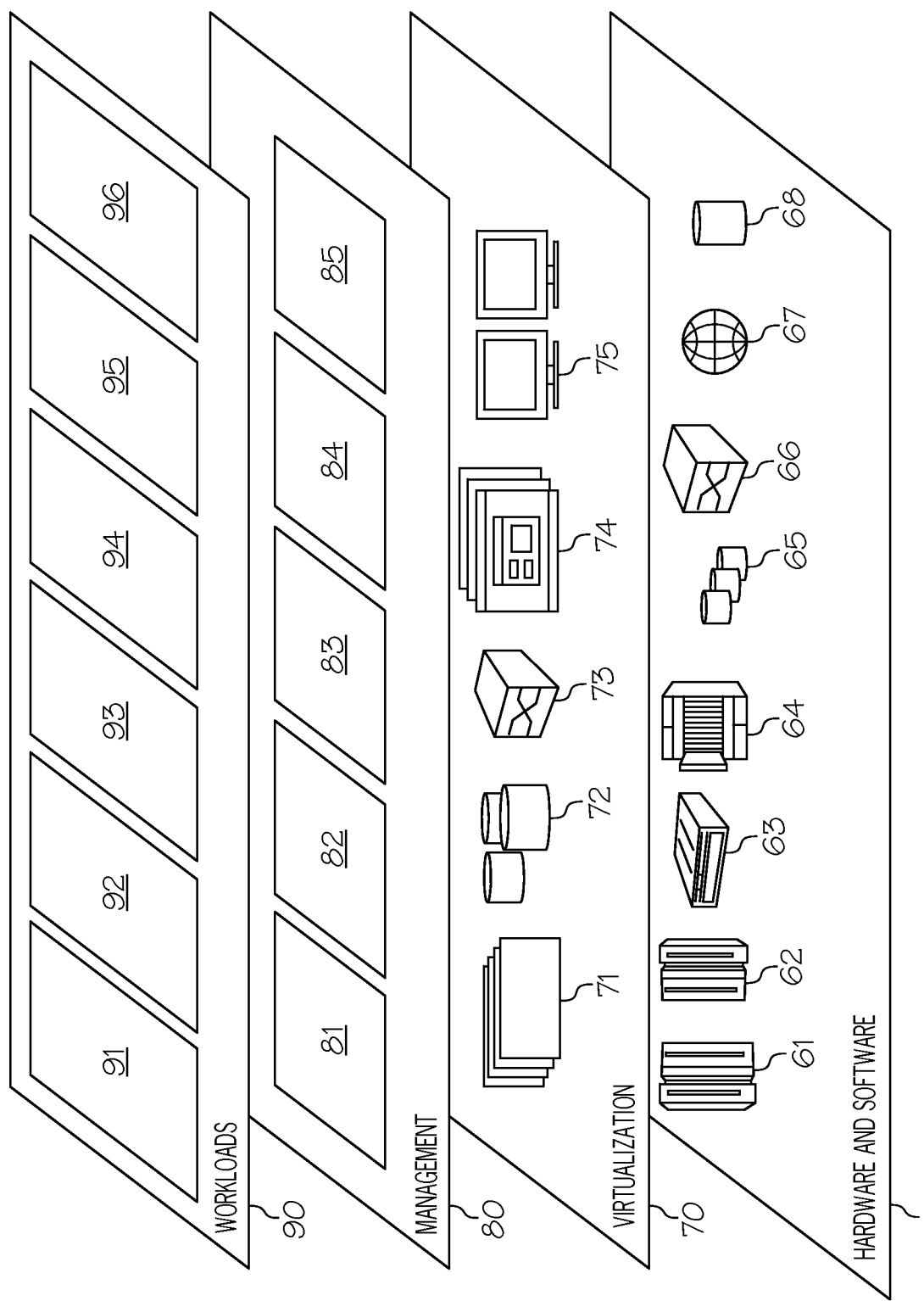
FIG. 7 depicts abstraction model layers according to an embodiment of the present disclosure.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and self-driving vehicle insurance toggling processing 96 (for selectively toggling vehicular insurance coverage on an SDV as described herein).

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

Any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A method comprising:
   receiving, by one or more processors and from an operational mode device, an electronic signal indicating an operational mode of a self-driving vehicle (SDV) in real-time, wherein operational modes comprise an autonomous mode and a manual mode, wherein a first insurance policy provision provides coverage while the SDV is operating in the autonomous mode, and wherein a second insurance policy provision provides coverage while the SDV is operating in the manual mode;
   identifying, by the one or more processors, a first route to a destination and a second route to the destination, wherein the SDV is traveling toward the destination;
   identifying, by the one or more processors, distances on the first route and the second route where operation of the SDV in the autonomous mode is permitted, and wherein both the first route and the second route permit autonomous mode vehicles to travel thereon;
   determining, by the one or more processors, that the first route includes a greater total distance Where operation of the SDV is permitted in the autonomous mode than the second route;
   in response to determining that the first route includes the greater total distance where operation of the SDV is permitted in the autonomous mode than the second route, transmitting, by a message transmitter, an electronic instruction to an SDV on-hoard computer on the SDV to drive the SDV to the destination using the first route, wherein the SDV on-board computer autonomously controls the SDV; and
   in response to detecting a change in real-time to the operational mode of the SDV while driving on the first route, dynamically toggling, by the one or more processors, activation of the first and second insurance policy provisions consistent with the change in real-time to the operational mode of the SDV.

2. The method of claim 1, further comprising:
   receiving, from sensors within the SDV, a sensor signal indicating a quantity of passengers in the SDV; and
   modifying, by the one or more processors, insurance coverage, for the SDV based on the quantity of passengers in the SDV, wherein the modified insurance coverage is effective only while the indicated quantity of passengers are in the SDV.

3. The method of claim 1, further comprising:
   receiving, from one or more roadway sensors, a real-time physical condition of a roadway upon which the SDV is traveling; and
   modifying, by the one or more processors, a price of insurance coverage for the SDV based on the real-time physical condition of the roadway, wherein the modified insurance coverage price is effective only while the real-time physical condition of the roadway exists.

4. The method of claim 1, further comprising:
   receiving, from one or more roadway sensors, a real-time traffic condition on a roadway upon which the SDV is traveling; and
   modifying, by the one or more processors, a price of insurance coverage for the SDV based on the real-time traffic condition on the roadway, wherein the modified insurance coverage price is effective only while the real-time traffic condition on the roadway exists.

5. The method of claim 1, wherein the SDV is traveling on a roadway, and wherein the method further comprises:
   retrieving, by the one or more processors, driver profile information about a human driver of the SDV;
   assigning, by the one or more processors, the human driver of the SDV to a cohort of drivers traveling on the roadway in multiple SDVs wherein the human driver of the SDV shares more than a predetermined quantity of traits with members of the cohort of drivers;

retrieving, by the one or more processors, traffic pattern data for the multiple SDVs occupied by the members of the cohort of drivers traveling on the roadway;

examining, by the one or more processors, the traffic pattern data to determine a first traffic flow of the multiple SDVs occupied by the members of the cohort of drivers, wherein the multiple SDVs in the first traffic flow are operating in the autonomous mode on the roadway;

examining, by the one or more processors, the traffic pattern data to determine a second traffic flow of the multiple SDVs occupied by the members of the cohort of drivers, wherein the multiple SDVs in the second traffic flow are operating in the manual mode on the roadway; and in response to determining that the first traffic flow has a lower accident rate than the second traffic flow, prohibiting, by an SDV on-board computer on the SDV, the SDV from operating in the manual mode.

6. The method of claim 1, further comprising:

receiving, by the one or more processors, operational readings from one or more operational sensors on the SDV, wherein the one or more operational sensors detect a current state of mechanical equipment on the SDV;

detecting, by the one or more processors and based on the received operational readings, a mechanical fault with the mechanical equipment on the SDV; and in response to detecting the mechanical fault with the mechanical equipment on the SDV, modifying, by the one or more processors, a price of insurance coverage for the SDV while the mechanical fault exists.

7. The method of claim 1, wherein the first and second insurance policy provisions are from an insurance policy that has a premium that provides insurance coverage during a trip to the destination, wherein the premium is a pre-paid predetermined amount of money, wherein a premium charge for the insurance coverage while the SDV is in the manual mode is greater than a premium charge for the insurance coverage while the SDV is in the autonomous mode, wherein the SDV is currently in the manual mode, and wherein the method further comprises:

determining, by the one or more processors, a remaining amount of the premium left on the policy;

determining, by the one or more processors, that the remaining amount of the premium is insufficient to pay for the insurance coverage to the destination while the SDV is driven in the manual mode; and in response to determining that the remaining amount of the premium is insufficient to pay for the insurance coverage to the destination while the SDV is driven in the manual mode, switching the SDV from the manual mode to the autonomous mode.

8. The method of claim 1, wherein the SEW is currently driving on the first route in the autonomous mode, and wherein the method further comprises:

detecting, by the one or more processors, that a current quantity of other vehicles on the first route that are not autonomous-enabled exceeds a predetermined quantity; and in response to detecting that the current quantity of other vehicles on the first route that are not autonomous-enabled exceeds the predetermined quantity, switching a driving mode of the SDV from the autonomous mode to the manual mode.

9. A computer program product for controlling a self-driving vehicle (SDV), the computer program product comprising a non-transitory computer readable storage medium having program code embodied therewith, the program code readable and executable by a processor to cause the processor to perform a method comprising:

receiving, from an operational mode device, an electronic signal indicating an operational mode of the SDV in real-time, wherein operational modes comprise an autonomous mode and a manual mode, wherein a first insurance policy provision provides coverage while the SDV is operating in the autonomous mode, and wherein a second insurance policy provision provides coverage while the SDV is operating in the manual mode;

identifying a first route to a destination and a second route to the destination, wherein the SDV is traveling toward the destination;

identifying distances on the first route and the second route where operation of the SDV in the autonomous mode is permitted, wherein both the first route and the second route permit autonomous mode vehicles to travel thereon;

determining that the first route includes a greater total distance where operation of the SDV is permitted in the autonomous mode than the second route;

in response to determining that the first route includes the greater total distance where operation of the SDV is permitted in autonomous mode than the second route, transmitting, by a message transmitter, an electronic instruction to an SDV on-board computer on the SDV to drive the SDV to the destination using the first route, wherein the SDV on-board computer autonomously controls the SDV; and in response to detecting a change in real-time to the operational mode of the SDV while driving on the first route, dynamically toggling activation of the first and second insurance policy provisions consistent with the change in real-time to the operational mode of the SDV.

10. The computer program product of claim 9, wherein the method further comprises:

receiving, from sensors within the SDV, a sensor signal indicating a quantity of passengers in the SDV; and modifying insurance coverage for the SDV based on the quantity of passengers in the SDV, wherein the modified insurance coverage is effective only While the indicated quantity of passengers are in the SDV.

11. The computer program product of claim 9, wherein the method further comprises:

receiving, from one or more roadway sensors, a real-time physical condition of a roadway upon which the SDV is traveling; and modifying a price of insurance coverage for the SDV based on the real-time physical condition of the roadway, wherein the modified insurance coverage price is effective only while the real-time physical condition of the roadway exists.

12. The computer program product of claim 9, wherein the method further comprises:

receiving, from one or more roadway sensors, a real-time traffic condition on a roadway upon which the SDV is traveling and modifying a price of insurance coverage for the SDV based on the real-time traffic condition on the roadway, wherein the modified insurance coverage price is effective only while the real-time traffic condition on the roadway exists.

13. The computer program product of claim 9, wherein the SDV is traveling on a roadway, and wherein the method further comprises:
- retrieving driver profile information about a human driver of the SDV;
- assigning the human driver of the SDV to a cohort of drivers traveling on the roadway in multiple SDVs, wherein the human driver of the SDV shares more than a predetermined quantity of traits with members of the cohort of drivers;
- retrieving traffic pattern data for the multiple SDVs occupied by the members of the cohort of drivers traveling on the roadway;
- examining the traffic pattern data to determine a first traffic flow of the multiple SDVs occupied by the members of the cohort of drivers, wherein the multiple SDVs in the first traffic flow are operating in the autonomous mode on the roadway;
- examining the traffic pattern data to determine a second traffic flow of the multiple SDVs occupied by the members of the cohort of drivers, wherein the multiple SDVs in the second traffic flow are operating in the manual mode on the roadway; and
- in response to determining that the first traffic flow has a lower accident rate than the second traffic flow, prohibiting, by an SDV on-hoard computer on the SDV, the SDV from operating in the manual mode.

14. The computer program product of claim 9, wherein the method further comprises:
- receiving operational readings from one or more operational sensors on the SDV, wherein the one or more operational sensors detect a current state of mechanical equipment On the SDV;
- detecting, based on the received operational readings, a mechanical fault with the mechanical equipment on the SDV; and
- in response to detecting the mechanical fault with the mechanical equipment on the SDV, modifying a price of insurance coverage for the SDV while the mechanical fault exists.

15. A self-driving vehicle (SDV) comprising:
- one or more processors, a computer readable memory, and a non-transitory computer readable storage medium;
- first program instructions configured to receive, from an operational mode device, an electronic signal indicating an operational mode of the SDV in real-time, wherein operational modes comprise an autonomous mode and a manual mode, wherein a first insurance policy provision provides coverage while the SDV is operating in the autonomous mode, and wherein a second insurance policy provision provides coverage while the SDV is operating in the manual mode;
- second program instructions configured to identify a first route to a destination and a second route to the destination, wherein the SDV is traveling toward the destination;
- third program instructions configured to identify distances on the first route and the second route where operation of the SDV in the autonomous mode is permitted, wherein both the first route and the second route permit autonomous mode vehicles to travel thereon;
- fourth program instructions configured to determine that the first route includes a greater total distance where operation of the SDV is permitted in the autonomous mode than the second route;
- fifth program instructions configured to, in response to determining that the first route includes the greater total distance where operation of the SDV is permitted in the autonomous mode than the second route, transmit, by a message transmitter an electronic instruction to an SDV on-board computer on the SDV to drive the SDV to the destination using the first route, wherein the SDV on-hoard computer autonomously controls the SDV;
- sixth program instructions configured to, in response to detecting a change in real-time to the operational mode of the SDV while driving on the first route, dynamically toggle activation of the first and second insurance policy provisions consistent with the change in real-time to the operational mode of the SDV; and
- wherein the first, second, third, fourth, fifth, and sixth program instructions are stored on the non-transitory computer readable storage medium for execution by the one or more processors via the computer readable memory.

16. The self-driving vehicle of claim 15, further comprising:
- seventh program instructions configured to receive, from sensors within the SDV, a sensor signal indicating a quantity of passengers in the SDV;
- eighth program instructions configured to modify insurance coverage for the SDV based on the quantity of passengers in the SDV, wherein the modified insurance coverage is effective only while the indicated quantity of passengers are in the SDV; and
- wherein the seventh and eighth program instructions are stored on the non-transitory computer readable storage medium for execution by the one or more processors via the computer readable memory.

17. The self-driving vehicle of claim 15, further comprising:
- seventh program instructions configured to receive, from one or more roadway sensors, a real-time physical condition of a roadway upon which the SDV is traveling;
- eighth program instructions configured to modify a price of insurance coverage for the SDV based on the real-time physical condition of the roadway, wherein the modified insurance coverage price is effective only while the real-time physical condition of the roadway exists; and
- wherein the seventh and eighth program instructions are stored on the non-transitory computer readable storage medium for execution by the one or more processors via the computer readable memory.

18. The self-driving vehicle of claim 15, further comprising:
- seventh program instructions configured to receive, from one or more roadway sensors, a real-time traffic condition on a roadway upon which the SDV is traveling;
- eighth program instructions configured to modify a price of insurance coverage for the SDV based on the real-time traffic condition on the roadway, wherein the modified insurance coverage price is effective only while the real-time traffic condition on the roadway exists; and
- wherein the seventh and eighth program instructions are stored on the non-transitory computer readable storage medium for execution by the one or more processors via the computer readable memory.

19. The self-driving vehicle, of claim 15, further comprising:
- seventh program instructions configured to receive operational readings from one or more operational sensors on the SDV, wherein the one or more operational sensors detect a current state of mechanical equipment on the SDV;

eighth program instructions configured to detect, based on the received operational readings, a mechanical fault with the mechanical equipment on the SDV;

ninth program instructions configured to, in response to detecting the mechanical fault with the mechanical equipment on the SDV, modify a price of insurance coverage for the SDV as long as the mechanical fault exists; and wherein the seventh, eighth, and ninth program instructions are stored on the non-transitory computer readable storage medium for execution by the one or more processors via the computer readable memory.

20. The SDV of claim 15, wherein the SDV is currently driving on the first route in the autonomous mode, and further comprising:

seventh program instructions configured to detect that a current quantity of other vehicles on the first route that are not autonomous-enabled exceeds a predetermined quantity;

eighth program instructions configured to, in response to detecting that the current quantity of other vehicles on the first route that are not autonomous-enabled exceeds the predetermined quantity, switch a driving mode of the SDV from the autonomous mode to the manual mode; and wherein the seventh and eighth program instructions are stored on the non-transitory computer readable storage medium for execution by the one or more processors via the computer readable memory.

* * * * *